(12) United States Patent
Bennett et al.

(10) Patent No.: US 7,330,740 B2
(45) Date of Patent: Feb. 12, 2008

(54) CELL PHONE WIRELESS SPEAKER-MICROPHONE SLEEP MODES

(75) Inventors: James D. Bennett, San Clemente, CA (US); Nambirajan Seshadri, Irvine, CA (US); Jeyhan Karaoguz, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 57 days.

(21) Appl. No.: 11/153,183

(22) Filed: Jun. 15, 2005

(65) Prior Publication Data

US 2005/0245292 A1   Nov. 3, 2005

Related U.S. Application Data

(63) Continuation-in-part of application No. 10/277,787, filed on Oct. 22, 2002.

(60) Provisional application No. 60/646,252, filed on Jan. 24, 2005.

(51) Int. Cl.
*H04B 1/38* (2006.01)
*H04M 1/00* (2006.01)
(52) U.S. Cl. ..................... 455/574; 455/553.1
(58) Field of Classification Search ............. 455/572, 455/573, 574, 575.2, 552.1, 553.1, 553
See application file for complete search history.

(56) References Cited

U.S. PATENT DOCUMENTS

| | | | |
|---|---|---|---|
| 5,842,141 A * | 11/1998 | Vaihoja et al. | 455/574 |
| 6,498,936 B1 * | 12/2002 | Raith | 455/466 |
| 6,973,335 B2 * | 12/2005 | Ganton | 455/573 |
| 6,993,357 B1 * | 1/2006 | Ito et al. | 455/552.1 |
| 2003/0212465 A1 * | 11/2003 | Howard et al. | 700/94 |

* cited by examiner

*Primary Examiner*—Joseph Feild
*Assistant Examiner*—Michael Faragalla
(74) *Attorney, Agent, or Firm*—Garlick, Harrison & Markison; James A. Harrison

(57) ABSTRACT

A hand held radio host includes circuitry for selectively providing power to radiating transceiver elements and non-radiating application elements according to a plurality of power modes of operation to achieve desired effects and in a way that saves power and extends battery life. In one embodiment of the invention, the hand held host operates in one of three modes. In a full power mode, any selected application element, as well as all transceiver elements, are powered on at the same time. Thus, for example, a cell phone module, a wireless personal access network module, a wireless local area network module, and one of a pager/short message service message module may all be powered on at the same time to receive corresponding messages, calls, data sessions, etc.

19 Claims, 8 Drawing Sheets

FIG. 4 hand held host 32

Mode Programming Table

| | WLAN/ WPAN | pager/ SMS | cell phone | calculator | game | address book/ calendar |
|---|---|---|---|---|---|---|
| mode 1 | yes | yes | yes | yes | yes | yes |
| mode 2 | no | no | no | yes | yes | yes |
| mode 3 | periodic | periodic | periodic | yes | yes | yes |
| mode 4 (low pwr) | periodic | no | no | no | no | yes (no) |
| mode 5 (custom) | periodic | no | no | no | yes | no |

FIG. 5

CELL PHONE WIRELESS SPEAKER-MICROPHONE SLEEP MODES

CROSS REFERENCES TO RELATED APPLICATIONS

The present U.S. Utility Patent Application claims priority pursuant to 35 U.S.C. § 119(e) to the following U.S. Provisional Patent Application which is hereby incorporated herein by reference in its entirety and made part of the present U.S. Utility Patent Application for all purposes:
1. U.S. Provisional Application Ser. No. 60/646,252, entitled "Cell Phone Wireless Speaker-Microphone Sleep Modes", filed Jan. 24, 2005, expired.

The present U.S. Utility Patent Application claims priority pursuant to 35 U.S.C. § 120, as a continuation-in-part (CIP) to the following U.S. Utility Patent Application which is hereby incorporated herein by reference in its entirety and made part of the present U.S. Utility Patent Application for all purposes:
1. U.S. Utility application Ser. No. 10/277,787, entitled "Power Management of Radio Transceiver Elements", filed Oct. 22, 2002, pending.

BACKGROUND

1. Technical Field

This invention relates generally to wireless communication systems and more particularly to radio frequency integrated circuits used in such wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s).

For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switched telephone network (PSTN), via the Internet, and/or via some other wide area network.

For each wireless communication device to participate in wireless communications, it either includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency (IF) stages, and a power amplifier. The data modulation stage converts raw data into baseband signals in accordance with a particular wireless communication standard. The one or more IF stages mix the baseband signals with one or more local oscillations to produce RF signals. The power amplifier amplifies the RF signals prior to transmission via an antenna.

As is also known, the receiver is coupled to the antenna and includes a low noise amplifier, one or more IF stages, a filtering stage, and a data recovery stage. The low noise amplifier receives inbound RF signals via the antenna and amplifies them. The one or more IF stages mix the amplified RF signals with one or more local oscillations to convert the amplified RF signal into baseband signals or IF signals. The filtering stage filters the baseband signals or the IF signals to attenuate unwanted out-of-band signals to produce filtered signals. The data recovery stage recovers raw data from the filtered signals in accordance with the particular wireless communication standard.

The need for wireless networking has been addressed by various standards bodies that promulgate inter-working standards. One such standards body promulgated the IEEE 802.11 standard that defines a wireless LAN. In a typical 802.11 wireless LAN, a wired backbone couples to one or more wireless access points (WAPs) that wirelessly connect to many computers or other electronic devices that contain wireless interfaces. IEEE 802.11 networks have achieved significant success in servicing wireless communication needs for portable computers, portable data terminals, and other wireless devices that transmit and receive data. However, IEEE 802.11 networks lack high data rate and Quality of Service (QoS) features to support multimedia communications.

Wireless personal area networks (WPANs) enable short-range "ad-hoc" connectivity among portable consumer electronics and communication devices but do not require the infrastructure needed for an 802.11 network. The WPAN™ Study Group (SG) was formed on Mar. 12, 1998 by the IEEE 802.11 Working Group to investigate the need for a supplemental wireless network standard specifically targeted to provide very low power consumption, low complexity, wireless connectivity among devices within or entering a Personal Operating Space (POS). This includes devices that are carried, worn, or located near the body. These activities have led to the development of 802.15, which is a WPAN standard.

Another known WPAN is Bluetooth. For both Bluetooth and 802.15 WPANs, the coverage area for a WPAN is generally within a 10-meter radius. In other words, a personal operating space is the space about a person that typically extends up to 10 meters in all directions and envelops the person whether stationary or in motion. It is within the POS that the portable device communicates with an access point. The Bluetooth radio system has emerged as the first technology addressing WPAN applications with its salient features of low power consumption, small package size, and low cost. A Bluetooth communication link supports up to three voice channels with very limited additional bandwidth for bursty data traffic. However, Bluetooth communication links cannot support the data transfer requirements of portable consumer electronic devices that transmit and receive multimedia data, e.g., high quality video applications, audio applications, and multi-megabyte file transfers for music and image files.

Each of the various stages of the radio receiver, whether its part of Bluetooth or an 802.15 WPAN, an 802.11 wireless local area network, or a cellular radio network, consume differing amounts of power but often operate on battery power. Because it is desirable to extend battery life to a maximum amount, many different communication devices provide for a sleep mode in which a radio is powered down until activated by the depression of a key or the like. Moreover, some of the standards provide for powering down a receiver for a specified period of time and then powering the receiver back up to enable it to engage in communications. The current designs and proposals, however, do not maximize the amount of power savings and do not provide for power saving modes and periods that maximally extend battery life.

Therefore, a need exists for a power management mode of operation that improves the power management functionality of a hand held device and that maximizes battery life before recharging is required.

BRIEF SUMMARY OF THE INVENTION

A hand held radio host includes circuitry for selectively providing power to radiating transceiver elements and non-radiating application elements according to a plurality of power modes of operation to achieve desired effects and in a way that saves power and extends battery life. Moreover, the hand held radio host includes logic for generating power control commands to an associated wireless host, a wireless headset for example, based upon at least one of a plurality of factors, including selected mode of operation, contents of a broadcast channel and, more specifically, whether the broadcast channel identifies any pending text or voice messages or that a call is incoming for the user of the hand held radio host.

In one embodiment of the invention, the hand held radio host operates in one of three modes. In a full power mode, any selected application element, as well as all transceiver elements, are powered on at the same time. Thus, for example, a cell phone module, a wireless personal access network module, a wireless local area network module and one of a pager/short message service message module may all be powered on at the same time to receive corresponding messages, calls, data sessions, etc. At the same time that all of the transceiver elements are powered on, any selected application element receives power. Thus, application elements such as address books, calendar functions, games, word processors, etc., may receive power when selected.

In a second mode of operation, namely, a silent mode of operation, only user selected application elements of the wireless hand held host can receive power. Radiating transceiver elements do not receive power in this mode of operation. Thus, upon selection of this mode, transceiver elements do not radiate but the application elements are readily accessible. This is helpful in many situations, including, for example, in flight where it is prohibited to use devices that radiate while cockpit or cabin doors are closed.

In a third mode of operation, a so-called deep sleep mode of operation, user transceiver elements only receive power on a periodic basis. In one embodiment of the invention, the transceiver elements receive power in a fixed interval, for example, once every five minutes. When a transceiver device element receives power in the periodic mode, it receives power as long as is necessary to check for, and if necessary, download any pending messages or data files. In this deep sleep mode, as well as in the silent mode of operation, an associated wireless headset host is placed into a sleep mode of operation as well.

The wireless headset host is kept in the sleep mode of operation even when the transceiver elements of the hand held radio host are powered up to inspect a broadcast channel, for example, for any pending text or voice messages for the hand held host. In one embodiment of the invention, the wireless headset host is kept in a sleep mode if a pending message is a text message (e.g., an SMS message or a text page) but is commanded to power up if a voice message is pending so that the audio of the voice message may be wirelessly transmitted to the wireless headset host for playback for the user. In an alternate embodiment, only receiver elements in the wireless headset are powered up to enable the user to listen to a voice message.

The invention further includes providing user selectable menus to enable a user to select what transceiver elements and application elements receive power in a custom mode of operation for both the hand held host and the wireless headset. In a different embodiment, each power mode of operation has selectable application and transceiver elements for receiving power whenever the various modes are selected. Finally, the user selectable menus enable the user to select a power-up mode of operation. Thus, for example, the user is able to select a particular application element for the default power-up mode of operation to enable the user to selectively activate remaining transceiver and application elements.

The various user selections are made through a graphical user interface in one embodiment of the invention. In another embodiment of the invention, however, the hand held host includes a plurality of power switches wherein each one corresponds to a mode of operation. The modes of operation, however, may be defined. More specifically, user selected transceiver and application elements are mapped to each of the plurality of power switches. Thus, regardless of whether the hand held host is powering on from an off state or is transitioning to the selected mode of operation, the user is able to specifically and easily control the mode of operation by predefining what elements corresponding to a particular switch (hardware or software) and then by depressing the switch whenever the corresponding mode of operation is desired.

BRIEF DESCRIPTION OF THE SEVERAL VIEWS OF THE DRAWINGS

FIG. 5 is a table illustrating one embodiment of the operation of the present invention;

DETAILED DESCRIPTION OF THE INVENTION

Figure 1:
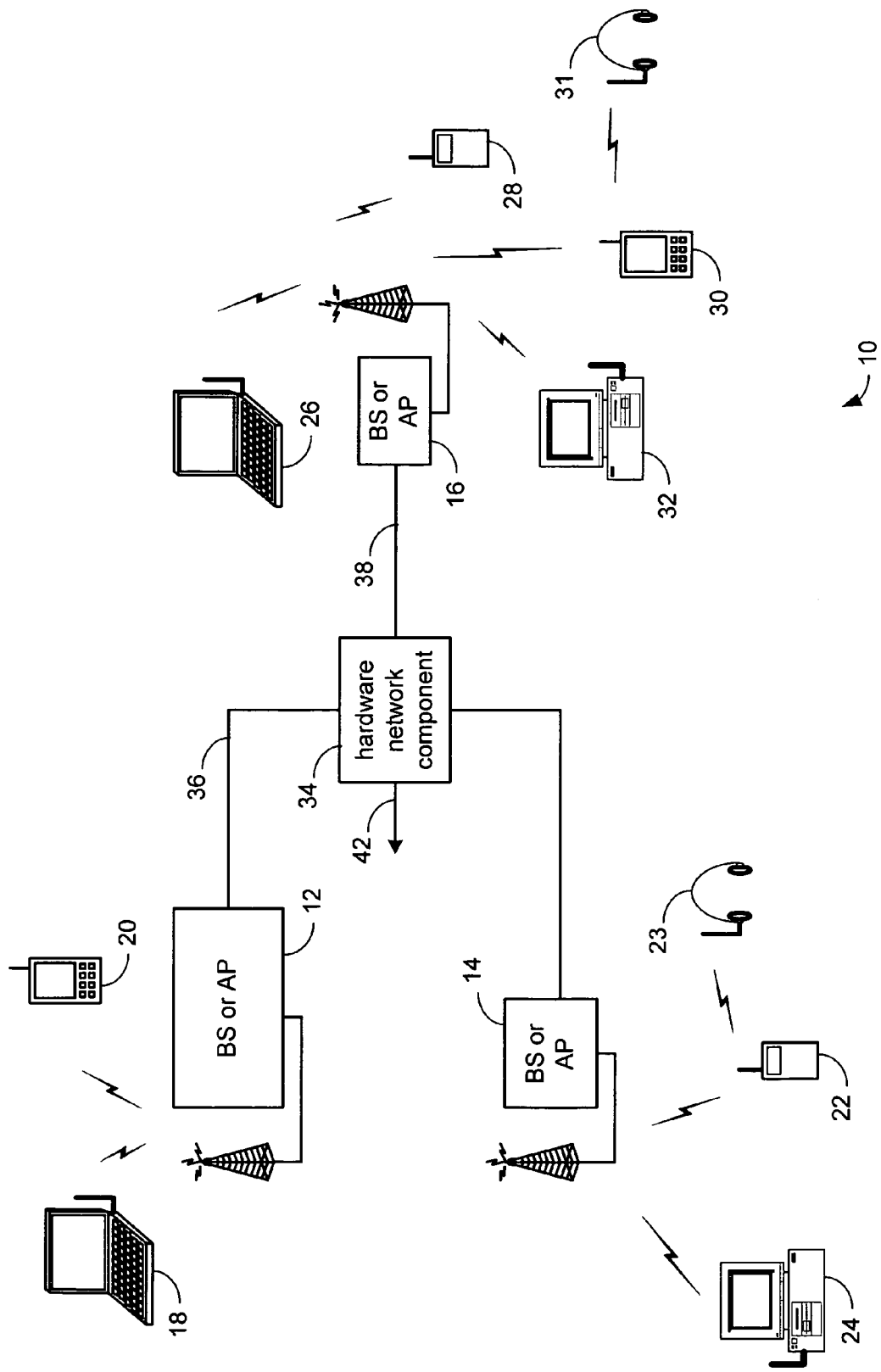
FIG. 1 is a schematic block diagram of a wireless communication system in accordance with the present invention.

FIG. 1 is a schematic block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, hand held hosts 20 and 30, personal computer hosts 24 and 32, and/or cellular telephone hosts 22 and 28. Hand held hosts 20 and 30 may comprise any hand held device having integrated wireless transceiver circuitry and may therefore comprise cellular phones, 802.11 protocol based devices, Bluetooth enabled devices, etc. Additionally, as may be seen, both cell phone host 22 and hand held host 30 are operable not only to communicate with a base station (BS) or access point (AP) 14 or 16, respectively, but also with a wireless headset host 23 and 31, respectively. As used herein, the term "hand held host" refers to any portable electronic device having at least one radio transceiver for communicating with at least one of a wireless headset and a base station or access point and therefore includes cell phone hosts.

As will be described below, each of cell phone host 22 and hand held host 30 of the described embodiment comprises at least two radio front end circuits for communicating over a plurality of communication protocols. The details of the wireless communication devices will be described in greater detail with reference to FIG. 2. As will be described in greater detail below, cell phone host 22 and hand held host 30 are both further operable to generate power control commands to define a power mode of operation of the associated headset 23 or 31 based upon its own mode of operation and upon a received communication signal from a base station or an access point, such as BS or AP 14 or 16. For example, if BS or AP 14 generates a broadcast message over a control channel indicating that there is a voice message waiting for a user of cell phone host 22, cell phone host 22 is operable to generate power control commands to headset host 23 to prompt headset host 23 to power up the receiver elements (at a minimum) to play back the message once cell phone host 22 retrieves the message from BS or AP 14.

The base stations or access points 12-16 are operably coupled to the network hardware component 34 via local area network connections 36; 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with a particular base station or access point 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio transceiver and/or is coupled to a radio transceiver. The radio transceiver includes a highly linear amplifier and/or programmable multi-stage amplifier, as disclosed herein, to enhance performance, reduce costs, reduce size, and/or enhance broadband applications.

Figure 2:
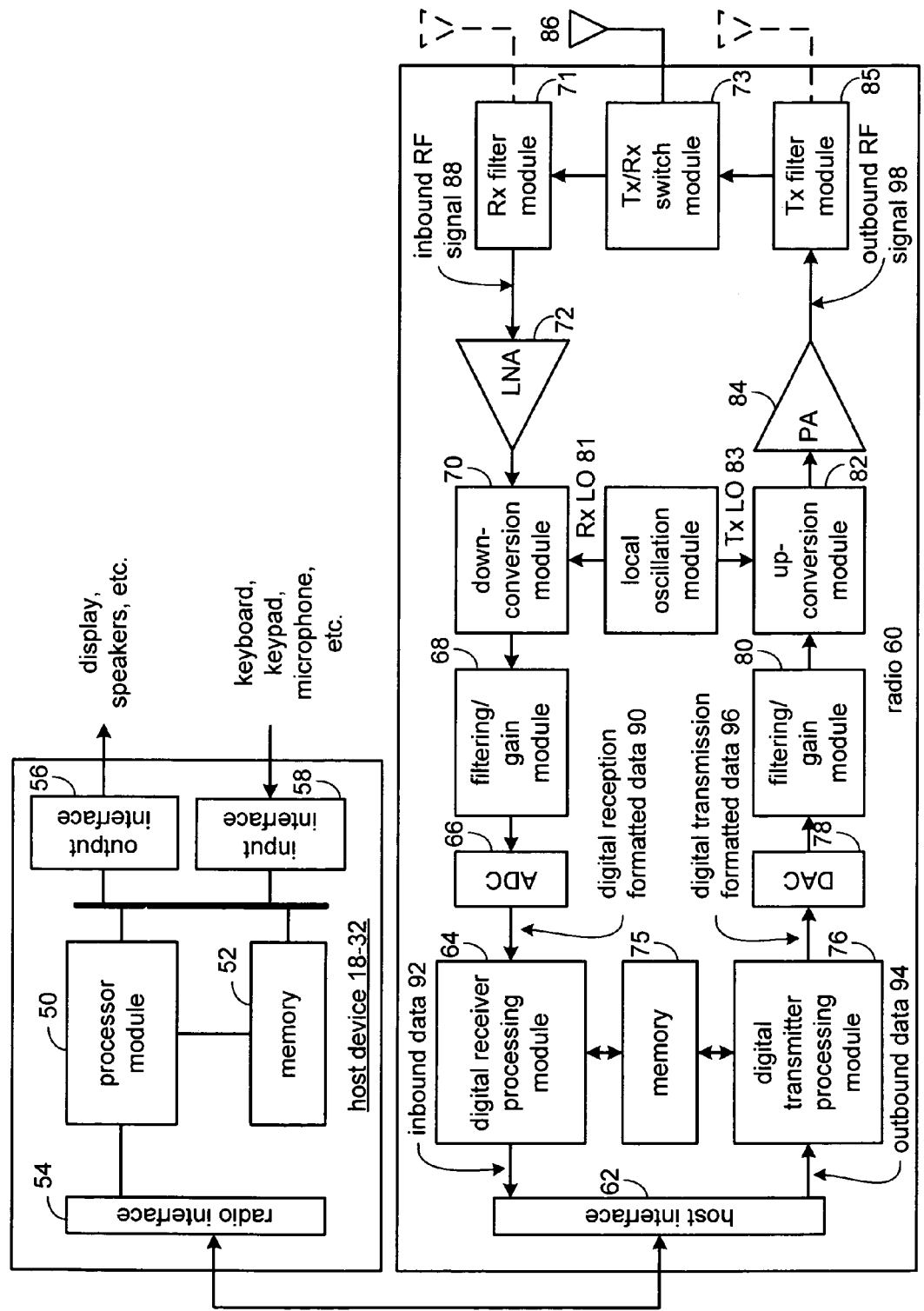
FIG. 2 is a schematic block diagram of a wireless communication device that includes a host device and an associated radio in accordance with the present invention.

FIG. 2 is a schematic block diagram illustrating a wireless communication device that includes the host device 18-32 and an associated radio 60. For cellular telephone hosts, the radio 60 is a built-in component. While only one radio 60 is shown, the embodiments of the invention, such as hosts 22 and 30 of FIG. 1 may include a plurality of radios 60 for communicating over a corresponding plurality of wireless communication links. For hand held hosts, laptop hosts, and/or personal computer hosts, the radio 60 may be built-in or an externally coupled component.

As illustrated, the host device 18-32 includes a processor module 50, a memory 52, a radio interface 54, an input interface 58 and an output interface 56. The processor module 50 and memory 52 execute the corresponding instructions that are typically done by the host device. For example, for a cellular telephone host device, the processor module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processor module 50 for further processing and/or routing to the output interface 56. The output interface 56 provides connectivity to an output device, such as a display, monitor, speakers, etc., such that the received data may be displayed. The radio interface 54 also provides data from the processor module 50 to the radio 60. The processor module 50 may receive the outbound data from an input device, such as a keyboard, keypad, microphone, etc., via the input interface 58 or generate the data itself. For data received via the input interface 58, the processor module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, an IF mixing down-conversion module 70, a receiver filter module 71, a low noise amplifier 72, a transmitter/receiver (TX/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 may be a single antenna that is shared by the transmit and receive paths as regulated by the TX/RX switch module 73, or may include separate antennas for the transmit path and receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital IF to baseband conversion, demodulation, constellation demapping, decoding, and/or descrambling. The digital transmitter functions include, but are not limited to, scrambling, encoding, constellation mapping, modulation, and/or digital baseband to IF conversion.

The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of 100 kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing up-conversion module 82. The IF mixing up-conversion module 82 directly converts the analog baseband signal or low IF signal into an RF signal based on a transmitter local oscillation 83 provided by local oscillation module 74, which may be implemented in accordance with the teachings of the present invention. The power amplifier 84 amplifies the RF signal to produce an outbound RF signal 98, which is filtered by the transmitter filter module 85. The antenna 86 transmits the outbound RF signal 98 to a targeted device, such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the TX/RX switch module 73, where the RX filter module 71 bandpass filters the inbound RF signal 88. The RX filter module 71 provides the filtered RF signal to low noise amplifier 72, which amplifies the inbound RF signal 88 to produce an amplified inbound RF signal. The low noise amplifier 72 provides the amplified inbound RF signal to the IF mixing down-conversion module 70, which directly converts the amplified inbound RF signal into an inbound low IF signal or baseband signal based on a receiver local oscillation 81 provided by local oscillation module 74, which may be implemented in accordance with the teachings of the present invention. The IF mixing down-conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 2 may be implemented using one or more integrated circuits. For example, the host device may be implemented a first integrated circuit, while the digital receiver processing module 64, the digital transmitter processing module 76 and memory 75 may be implemented on a second integrated circuit. The remaining components of the radio 60, less the antenna 86, may be implemented on a third integrated circuit. As an alternate example, the radio 60 may be implemented on a single integrated circuit. As yet another example, the processor module 50 of the host device 18-32 and the digital receiver and transmitter processing modules 64 and 76, respectively, may be a common processing device implemented on a single integrated circuit. Further, memory 52 and memory 75 may be implemented on a single integrated circuit and/or on the same integrated circuit as the common processing modules of processor module 50, the digital receiver processing module 64, and digital transmitter processing module 76.

Some or all of the radios 60 of FIG. 1 include power management functionality to enable a power management controller to selectively power down and power up radio receiver elements according to a plurality of different modes or aspects of operation as is described in greater detail with reference to the figures that follow.

Figure 3:
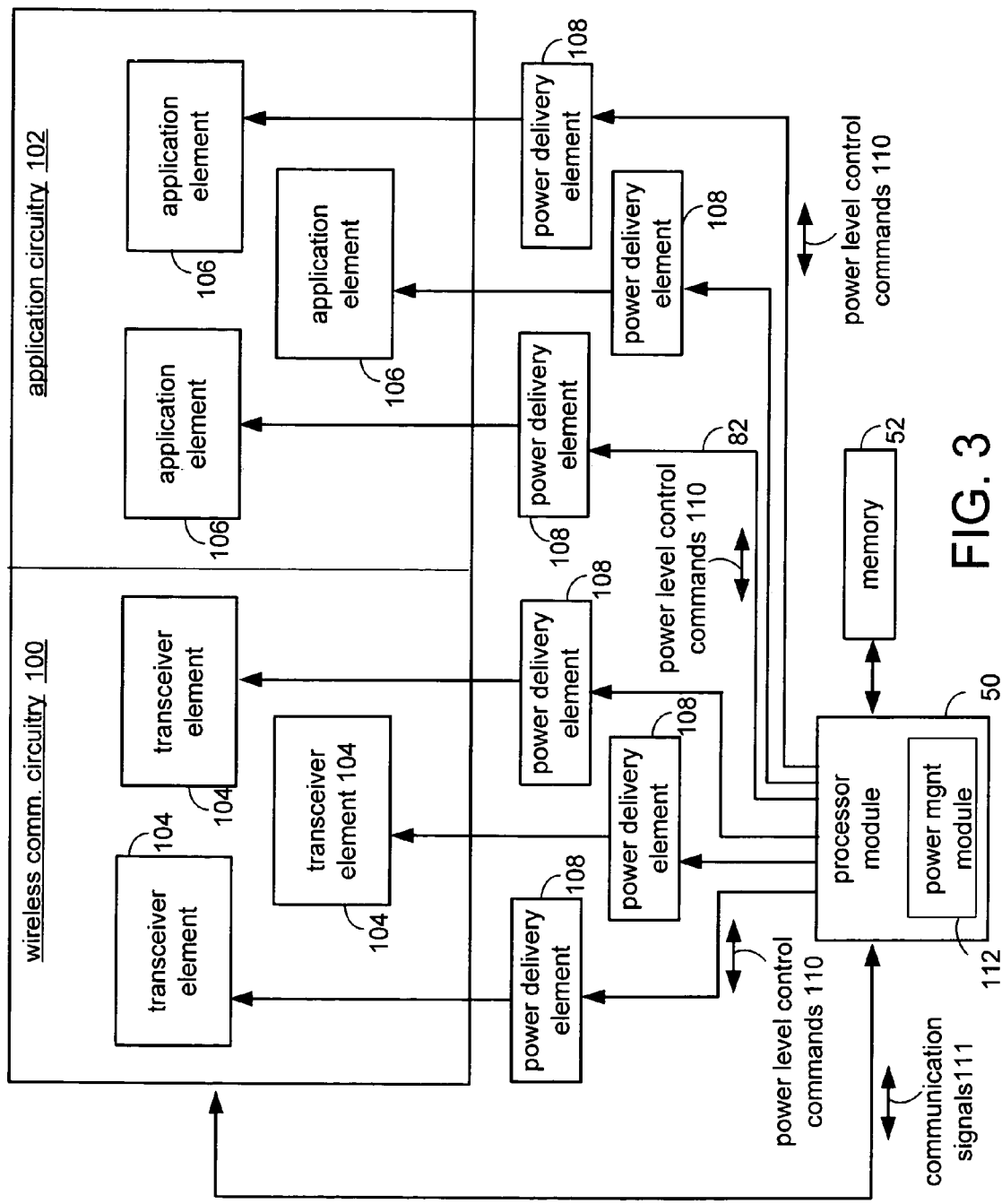
FIG. 3 is a functional block diagram of a hand held host formed according to one embodiment of the present invention.

FIG. 3 is a functional block diagram of a hand held host formed according to one embodiment of the present invention. Hand held host 30 of FIG. 1 is shown here in FIG. 3 and includes wireless communication circuitry 100 and application circuitry 102. Wireless communication circuitry 100 includes a plurality of transceiver elements 104, while application circuitry 102 includes a plurality of application elements 106. The transceiver elements 104 comprise any one of a plurality of wireless transceiver modules (or elements), including cellular voice and data networks, including GSM, TDMA, CDMA, GPRS, 1xEVDO and 1xEVDV, as well as 802.04, 802.11 and 802.15 standard-based protocol devices for wireless local area networks (WLANs), wireless personal access network (WPAN) devices, including Bluetooth and WLAN devices, infrared data association (IrDA) standards, and serial infrared communication data links.

Similarly, application circuitry 102 includes application elements 106 that may be any one of a group of elements comprising of remote I/O (RIO) devices, MP3 players, game modules, contact and schedule applications, such as address books and calendars, and peripheral interface modules (PIMs). This list of modules is not exhaustive. The invention applies with equal force to any module installed in a portable device.

As may be seen, each of the transceiver elements 104 and application elements 106 are coupled to a corresponding power delivery element 108. Each of the power delivery elements 108 is coupled to a processor module 50 that generates power level control commands 110 over the power control lines to the power delivery elements 108. Generally, processor module 50 generates power level control commands 110 for each power delivery element 108 to prompt it to provide full power, reduced power, or no power, to its corresponding transceiver element 104 or application element 106. Processor module 50 includes a power management module 112, which includes logic to determine the respective power levels for each of the transceiver elements 104 and application elements 106 and generates communications to processor module 50 to prompt it to generate corresponding power level control commands 110 over the corresponding power control lines to the corresponding power delivery elements 108. In one embodiment of the invention, power management module 112 comprises computer instructions that are executed by processor module 50 to achieve operations according to logic defined by the computer instructions. In an alternate embodiment, the logic for power management module 112 is formed in hardware. For example, the logic may be formed in state logic or in a programmable gate array. Additionally, processor module 50 is coupled to communicate with wireless communication circuitry 100 to transmit thereto and receive therefrom communication signals 111.

As may be seen, the embodiment of FIG. 3 allows power management module 112 to prompt processor module 50 to generate power level control commands 110 to any of the transceiver elements 104 or application elements 106 and power delivery elements 108 for controlling power provided thereto. Accordingly, intelligent power control may be achieved to maximize battery life and facilitate more intelligent operation of the hand held host 30. At its most rudimentary level, several power modes may be defined. For example, in a first mode of operation, each of the transceiver elements 104 of wireless communication circuitry 100, as well as each of the application elements 106 of application circuitry 102, may be powered on in the first mode of operation.

Alternatively, in a second mode of operation, for example, a silent mode of operation, processor module 50 may generate power level control commands to power delivery elements 108 to result in power being applied only to the application elements 106. Thus, in this embodiment, hand held host 30 may be utilized in environments in which radiation is not permitted. For example, each of the application elements 106 may be powered while a user of hand held host 30 is traveling on a jet airplane, while power is not provided to the transceiver elements 104 in order to comply with Federal Aviation regulations. Alternatively, only very low power, short range transceiver elements, such as a Bluetooth radio front end for a wireless headset, may be powered.

Figure 4:
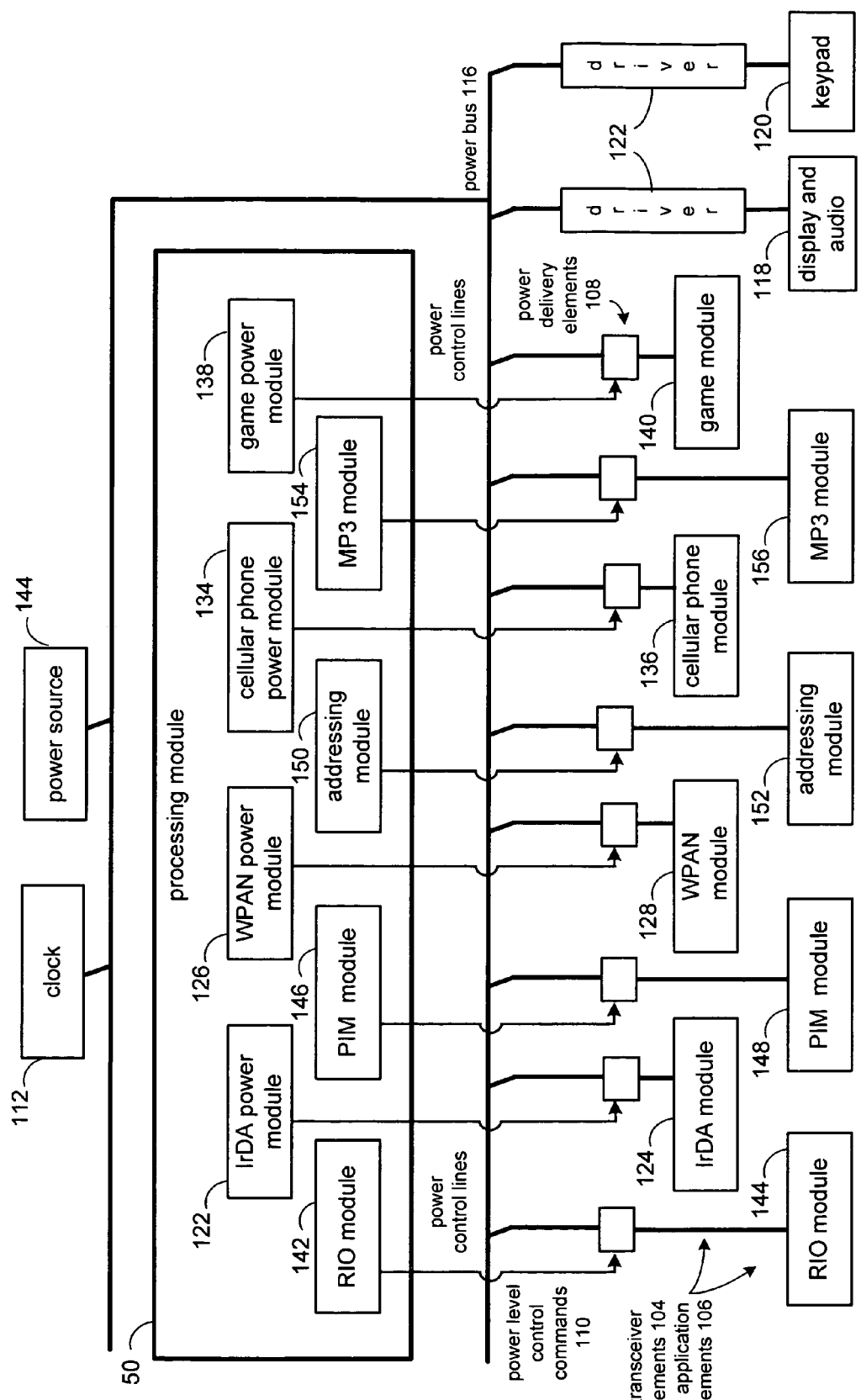
FIG. 4 is a functional block diagram illustrating additional aspects of the invention.

FIG. 4 is a functional block diagram illustrating additional aspects of the invention. A hand held host 30 includes a clock 113 and a power source 114. Power source 114 is coupled to provide power on a power bus 116. Each element, device or module of hand held host 30 is coupled either directly or indirectly to receive power from power bus 116. Thus, a processor module 50, as well as each of the plurality of transceiver elements and application elements shown generally at 104 and 106, respectively, are coupled to receive power from power bus 116. Each of the transceiver and application elements 104 and 106, however, are coupled to receive power indirectly by way of power delivery elements 108. In the exemplary embodiment of FIG. 4, one power delivery element 108 selectively provides power for one transceiver or application element 104 or 106, respectively. Additionally, a display and audio module 118 and keypad module 120 receive power from power bus 116 by way of a pair of drivers 122.

Within processor module 50, there exists a plurality of logic modules that generate power level control commands 110 over power control lines that are each coupled to a corresponding power delivery element 108. Thus, for example, an IrDA power module 122 generates power level control commands 110 for controlling power provided to an IrDA module 124. Similarly, a WPAN power module 126 controls power delivery to a WPAN module 128. A cellular phone power module 134 controls power delivered to a cellular phone module 136 and a game power module 138 controls power delivered to a game module 140. Similarly, a portable audio power module 142 controls power delivered to portable audio module 144, while a transceiver power module 146 controls power delivered to a transceiver module 148. Finally, an address book power module 150 controls power delivered to an address book module 152, while an MP3 power module 154 controls power delivered to an MP3 compression standard audio module 156.

By minimizing the number of modules of the transceiver and application elements 104 and 106 that are powered on, the power drained from power bus 116 provided by power source 114 is reduced. In the case of portable electronics, power source 114 is a battery whose charge may be quickly depleted. Additionally, in one embodiment of the invention, the clock rate provided by clock 113 further is coupled to receive speed control signals generated by processor module 50 according to what transceiver and application elements 104 and 106 are powered on so as to reduce unnecessary processing speed and power consumption associated therewith. Thus, processor module 50 includes logic to generate speed control signals to clock 113 to provide appropriate clock rates and to further minimize unnecessary consumption of power. The embodiment of FIG. 4 therefore illustrates selective powering of individual application and transceiver elements regardless of which types of elements are within a given handheld device.

FIG. 5 is a table illustrating one embodiment of the operation of the present invention. As may be seen in the mode programming table of FIG. 5, for each of the five modes listed in column 160 there exists an indication of a corresponding power mode for each of the transceiver and application elements 104 and 106 listed specifically in columns 164 through 184. The transceiver and application elements 104 and 106 are listed specifically in row 188. In one embodiment each mode is selectable through a graphical user interface. In another embodiment, at least one mode is selectable by switches on the hand held device.

More specifically, the present example is for a hand held host that includes a wireless LAN/wireless personal access network (WLAN/WPAN), a pager/short message service (SMS) module, a cell phone, a calculator, at least one game application, and an address book/calendar application. Thus, as may be seen, if mode 1 operation is selected, then each transceiver and application element 104 and 106 listed is powered on, as shown generally in row 192. If mode 2 operation is selected, then each of the transceiver elements 104 do not receive power, while each of the application elements 106 do receive power, as is shown generally in row 194. More specifically, the WLAN/WPAN, the pager/SMS and the cell phone do not receive power, while the calculator, game and address book/calendar do receive power.

If mode 3 operation is selected, as shown in row 198, the WLAN/WPAN, pager/SMS and cell phone each receive power only on a periodic basis, while the calculator, game and address book/calendar receive continual power. If mode 4 operation is selected the transceiver elements 104 receive power on a periodic basis, while all other application elements 106 do not receive power unless specifically selected. Accordingly, as may be seen in row 202, the WLAN/WPAN receives power periodically to enable it to search for and download messages, while the pager/SMS and cell phone are not powered on (unless specifically selected). Similarly, none of the application elements 106 are powered unless specifically selected. Thus, in the example shown, the address book/calendar has been selected and therefore does receive power, while the calculator and game do not receive power.

Finally, row 206 illustrates mode 5 operation, which is a custom mode of operation in the described embodiment. In the custom mode of operation, a user is able to specify in advance what elements receive power during that mode of operation. For example, the user may decide to play a game and to disable the cell phone and pager/SMS, but to enable the WLAN/WPAN to periodically access its corresponding network to download any queued messages or data. Additionally, as may be seen, neither the calculator nor the address book/calendar receive power while the game mode is selected through custom mode 5. As will be illustrated below, the user is able to select what transceiver elements 104 and application elements 106 receive power during the custom mode and the type of power that they receive.

In the described embodiment, mode 4, which is reserved for low power operation, also is programmable. Accordingly, in the example here in FIG. 5, the user has opted to only enable the WLAN/WPAN to operate on a periodic mode, while other transceiver elements 104 do not receive power when the hand held host power levels fall below a specified threshold. Moreover, as is shown herein, none of the application elements 106 receive power unless specifically selected to operate while in the low power mode. Thus, while the calculator and game receive power, the example in FIG. 5 illustrates that the address book/calendar does not receive power (as the parenthetical indicates) unless specifically selected while the hand held host is in the low power mode 4 operation.

Figure 6:
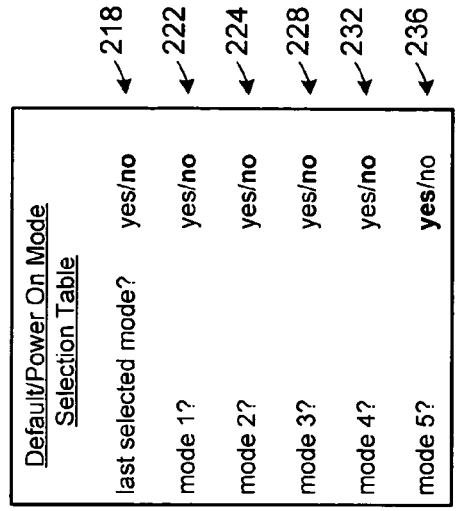
FIG. 6 is a table illustrating mode selection according to one aspect of the present invention.

FIG. 6 is a table illustrating mode selection according to one aspect of the present invention. As may be seen from referring to FIG. 6, the column shown generally at 210 lists each of the five modes of one embodiment of the present invention, while the column shown generally at 214 illustrates the selection of the mode of operation. Accordingly, as may be seen, mode 5 has been selected as the operating mode for the hand held host as described in this embodiment. In the specific example, mode 5 corresponds to the custom mode of row 206 in FIG. 5. In one embodiment, all options are shown at once. In an alternate embodiment, less than all modes are shown and the user must scroll through the options to select the mode of operation.

Figure 7:
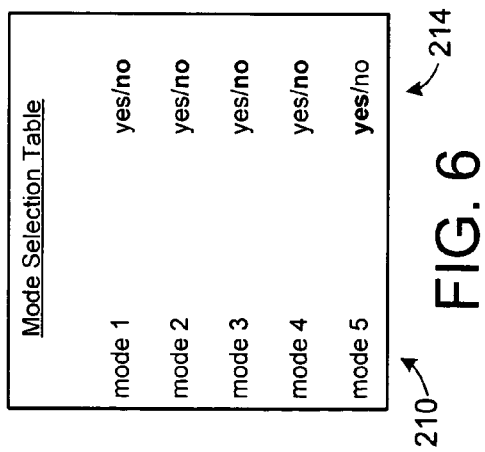
FIG. 7 is a table illustrating an aspect of one embodiment of the present invention and, more specifically, the selection of operating parameters for a custom mode of operation.

FIG. 7 is a table illustrating an aspect of one embodiment of the present invention and, more specifically, the selection of operating parameters for a customized deep sleep mode of operation. As may be seen, transceiver elements 104 are shown in the upper portion of the table of FIG. 7, while the application elements 106 are shown in the bottom portion. For each of the transceiver elements 104, namely, the WLAN/WPAN, the pager/SMS, and the cell phone, the user has the option of selecting whether the transceiver element is to receive power, is not to receive power, or is to receive power on a periodic basis. Thus, in the example shown, the WLAN/WPAN is to receive power periodically, while the pager/SMS and cell phone are not to receive power whenever the custom mode 5 operation is selected.

In the described embodiment, periodic refers to the transceiver element receiving power on a periodic basis, for example, once every 5 minutes, to enable the corresponding transceiver element to communicate with an external node to download queued messages or data therefrom. Once the communication is complete and the transceiver element determines that there are no more messages or data to be downloaded, then the transceiver element is powered off. In the described embodiment, the transceiver element is powered on once every 5 minutes. The duration of the period, however, may easily be modified and may even be modified on a transceiver element by transceiver element basis. In one embodiment of the present invention, the user is able to select the periodic intervals for each of the transceiver elements when operating in the periodic mode of operation.

With respect to the application elements 106 shown in the bottom portion of the custom application selection table of FIG. 7, one may note that the user has selected the game module of the application elements 106 to receive power, while the calculator and other applications do not receive power. In the described embodiment, only one application element 106 receives power in a given mode, including the custom mode of operation. In alternate embodiments, multiple application elements are allowed to receive power at the same time. In a full power mode in the described embodiment, however, only one application element receives power.

The transceiver elements 104, on the other hand, all receive power in a full power mode so that they all may operate to communicate with their corresponding networks. Thus, in a full power mode, the cell phone module can receive calls, the pager/SMS module may receive pages and SMS messages, and the WLAN/WPAN may receive text files, emails, etc., all at the same time and, thus, all are powered on in a full power mode while only one application element (at most) receives power. In the embodiment of this invention, the hand held host powers on to one of a defined application element or a last-selected application element and requires user selection prior to applying power to any one or more transceiver elements. As is described herein, however, many different embodiments exist for power on operation.

In the customized deep sleep power mode, as shown in FIG. 7, each of the devices that receive power is selectable and thus receives power according to user preference. In the example of FIG. 7, in summary, only the game module receives power continuously and the WLAN/WPAN module receives power periodically. All other devices, in the custom mode of operation, do not receive power until the user makes changes to his or her selections shown in the table of FIG. 7. In general, FIG. 7 reflects that a user may make power selections, which are then mapped to the custom mode of operation and are enabled whenever the custom mode is selected.

For wireless hand held units that include a wireless headset operatively coupled thereto, the hand held units generate wireless power control commands to the wireless headset according to a selected mode of operation. For example, in a periodic power saving mode such as the deep sleep mode described above, the hand held unit generates power control commands to the wireless headset to place the wireless headset into a power saving mode of operation. Thus, the power mode of the wireless headset, which includes its own processor and transceiver circuitry, is a function of the wireless hand held unit. In an alternate embodiment, the power mode of the wireless headset is a selectable mode of the hand held unit. For example, if the hand held unit includes portable audio circuitry for an audio device, such as an MP3 player, a user may choose to actively select a power down mode for the wireless headset in which only receiver circuitry receives power. In an alternate embodiment, power down commands are transmitted to the wireless headset during specified modes of operation. For example, when a user selects to place the audio player into a pause or standby mode, the hand held unit generates power control commands to prompt the wireless headset to power down audio processing circuit elements including audio receiver and transmitter circuit elements.

Figure 8:
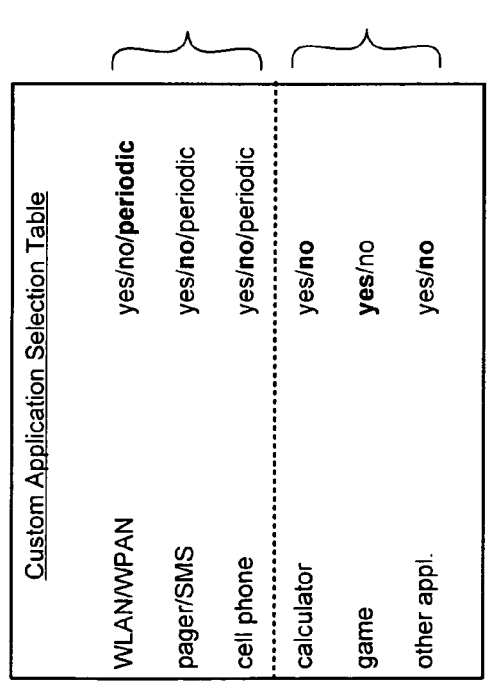
FIG. 8 illustrates a default power on mode selection table illustrating yet another aspect of the present invention.

FIG. 8 illustrates a default power on mode selection table illustrating yet another aspect of the present invention. In general, one consideration is what default mode of operation exists for a hand held host whenever power is initially applied. In one embodiment of the invention, the default mode of operation includes applying power only to a selected application element 106 that does not radiate radio frequency wireless transmission signals. Thus, a user may readily power on the hand held host in an airplane without violating Federal aviation regulations.

In an alternate embodiment of the invention, and in the one illustrated by FIG. 8, the user is able to select a default operational mode. Thus, as shown in row 218, the user is able to specify the default mode is always the last selected mode. In rows 222 through 236, however, the user is able to specify which of the five modes of operation is the default mode. In this example, the user has selected mode 5 (the custom mode) as the default mode of operation. Accordingly, if the custom mode of operation is as defined in FIG. 7, when the user powers on the hand held host, only the game module initially receives power on a continual basis, while the WLAN/WPAN module receives power on a periodic basis. Thus, if the user were on a flight, he or she would need to immediately disable power to the WLAN/WPAN so as not to violate Federal Aviation regulations. If, on the other hand, the user is not in an environment which electromagnetic radiations are prohibited, then the configuration for the custom mode of operation of FIG. 7 is ideal for a user that wishes to play a game, for example, without significant interruption from the cell phone and/or pager.

Figure 9:
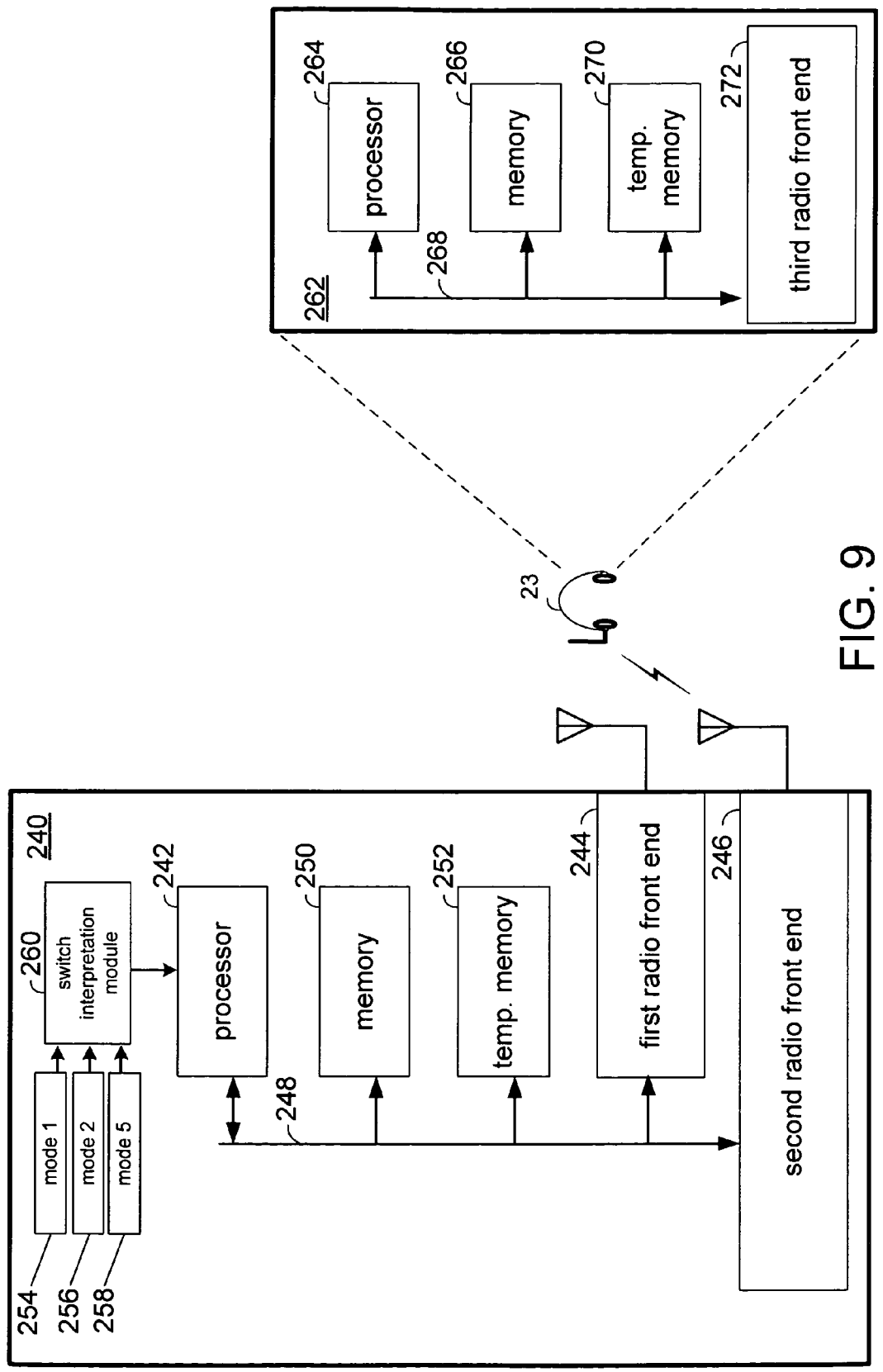
FIG. 9 is a functional block diagram of an embodiment of the invention of a radio transceiver hand held host system.

FIG. 9 is a functional block diagram of an embodiment of the invention of a radio transceiver hand held host system. Referring to FIG. 9, the radio transceiver hand held host system includes a first wireless transceiver unit 240 and a second wireless transceiver unit 262 that integrally operate as a single hand held host system. In the described example, second wireless transceiver unit 262 comprises a wireless headset that receives and transmits audio from and to the first wireless transceiver unit 240.

First wireless transceiver unit 240 further includes a processor 242 that communicates with a first radio front end 244 and a second radio front end 246 over a bus 248. The first and second radio front ends 244 and 246 include typical radio front end components, such as those shown in and described in relation to FIG. 2, though in the described embodiment are formed to operate according to first and second communication protocols, respectively. First wireless transceiver unit 240 further includes a memory 250 for storing computer instructions that define the operational logic of first wireless transceiver unit 240. Processor 242 retrieves the computer instructions from memory 250, as well as from a temporary memory 252.

In the described embodiment, processor 242 communicates with first radio front end 244 over the bus or communication lines represented by 248 and with memory 250 and temporary memory 252 over internal bus 248. It is understood, of course, that many different types of connections may be implemented to facilitate the communication between processor 242, memory 250 and temporary memory 252, as well as between processor 242 and first radio front end 244.

Continuing to examine the first wireless transceiver unit 240 of FIG. 9, it may be seen that three hardware switches 254, 256 and 258 are provided, each of which is for prompting a switch interpretation module 260 to power on first wireless transceiver unit 240 in a corresponding mode of operation. For example, in the described embodiment, switch 254 relates to power mode 1 operation, while switch 256 relates to power mode 2 operation and switch 258 relates to power mode 5 (the customized deep sleep mode) of operation. Thus, whenever first wireless transceiver unit 240 is powered off and is dormant, the depression of one of the switches, namely, switches 254, 256 or 258, will cause processor 242 to execute computer instructions within memory 250 to operate in the corresponding power mode of operation. If, for example, switch 258 is depressed, switch interpretation module 260 initiates power up routines and transmits selected mode information to processor 242, which it implements as it powers up first wireless transceiver unit 240 to prompt first wireless transceiver unit 240 to power up into the custom power mode of operation. In the examples, herein, since the custom power mode of operation provides for periodic power to be applied to the WLAN/WPAN module and continuous power to the game module and for all other modules and elements to be powered off, processor 242 will provide power to the corresponding modules in the described manner if the custom mode is programmed as shown in FIG. 5.

In the embodiment of FIG. 9, each of the power (logic) modules described, for example, in FIGS. 3 and 4, are logically formed by the execution of computer instructions stored within memory 250 that define logic to create and operate according to logic of the corresponding modules in one embodiment of the invention. It is understood, of course, that the modules may readily be formed in hardware or a combination of hardware and software as well. Additionally, if first wireless transceiver unit 240 is presently operating in a mode (any defined power mode), and one of the three switches 254, 256 or 258 is depressed, then first wireless transceiver unit 240 will change modes to the one that corresponds to the depressed power mode switch. Finally, while not shown specifically herein, it is understood that a user menu may be created to enable the user to select modes of operation corresponding with the three switches 254, 256 and 258. Thus, switch 258 may readily be programmed to initiate any other power mode of operation. Similarly, corresponding power modes of operation may be defined for switches 254 and 256. Additionally, as shown herein, the characteristics of each mode also are selectable.

Continuing to examine FIG. 9, first radio front end 244 is operable to communicate over a first communication protocol while second radio front end 246 is operable to communicate over a second communication protocol. For example, in the described embodiment, first radio front end 244 communicates with a remote base station over a cellular communication protocol, such as GSM or CDMA, while second radio front end 246 communicates with a second wireless transceiver unit 262 utilizing a Bluetooth personal area network protocol. Alternatively, any wireless local area network protocol may be used by the second radio front end 246, including any 802.11 based protocol.

Second wireless transceiver unit 262 is operable to communicate with the second radio front end 246 using the second communication protocol. As may be seen, second wireless transceiver unit 262 includes a processor 264 that executes computer instructions retrieved from memory 266 over bus 268. The instructions include instructions that define operational logic of the second wireless transceiver unit 262. Any data may be temporarily stored in temporary memory 270. Generally, processor 264 generates outgoing digital data and receives ingoing digital data to and from a third radio front end 272. The third radio front end 272 includes circuitry including ADCs, DACs, amplifiers, frequency control circuitry and other radio front end circuits as described, for example, in relation to FIG. 2. Second wireless transceiver unit 262 further includes computer instructions that define power control logic to cause second wireless transceiver unit 262 to operate as described herein, including operating in a power control mode as indicated within power control commands transmitted by the second radio front end 246 of the first wireless transceiver unit 240 and as received through the third radio front end 272. Thus, second wireless transceiver unit 262 may selectively power down any one of the circuit elements of the third radio front end 272, including the ADC, DAC, amplifier, frequency control circuitry and other radio front end circuits based upon power control commands received from first wireless transceiver unit 240.

Figure 10:
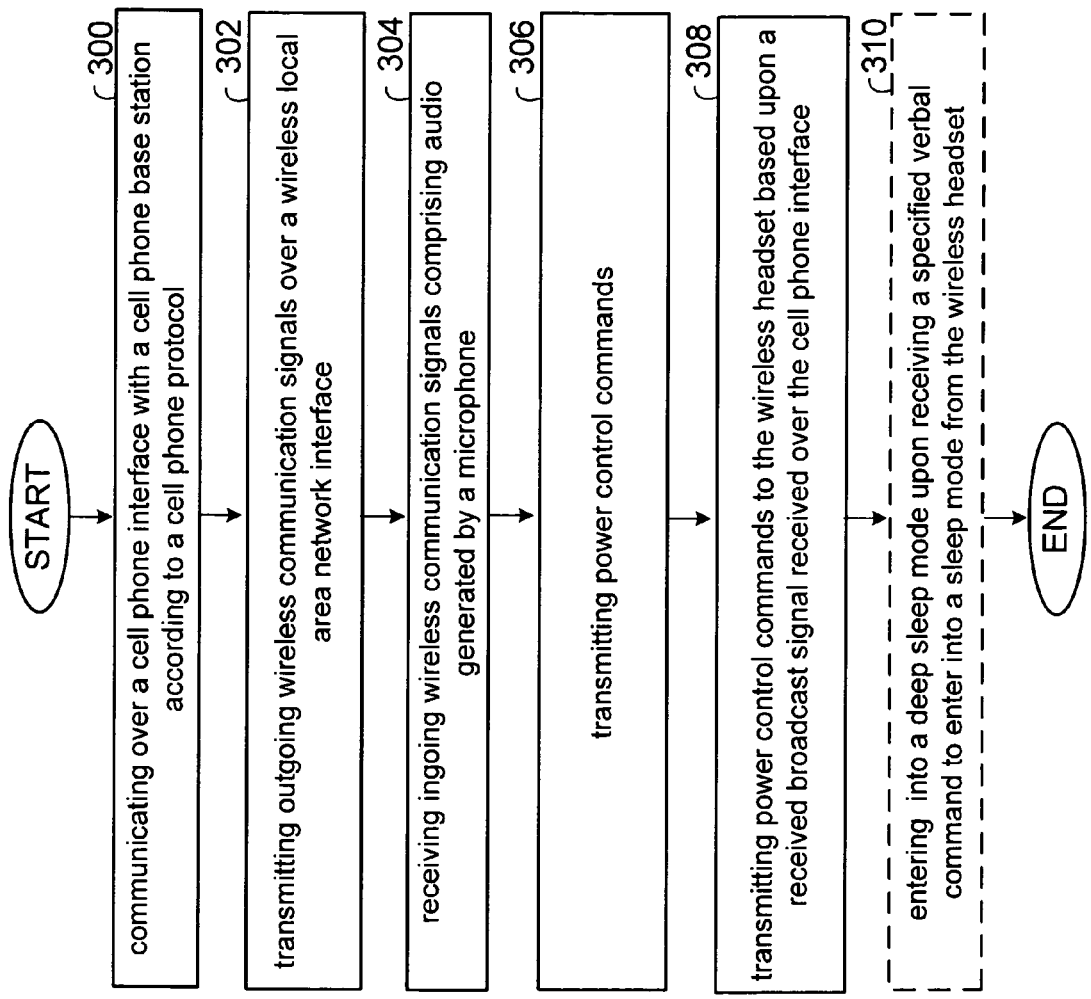
FIG. 10 is a flowchart illustrating a method for power control in a wireless cell phone host according to one embodiment of the present invention.

FIG. 10 is a flow chart illustrating a method for power control in a wireless cell phone host according to one embodiment of the present invention. Initially, the method includes the cell phone host communicating over a cell phone interface with a cell phone base station according to a cell phone protocol (step 300). The method further includes transmitting outgoing wireless communication signals over a wireless local area network interface wherein the wireless communication signals comprise audio to the wireless headset for playback over a speaker (step 302). It is understood that any relatively short range system and protocol may be used to transmit the outgoing wireless communication signals. In the described embodiment, the wireless communication signals are transmitted to a wireless headset utilizing a Bluetooth personal area network protocol. The inventive method further includes receiving ingoing wireless communication signals comprising audio from the wireless headset generated by a microphone (step 304). Thereafter, the inventive method includes transmitting power control commands to prompt the wireless headset to power down based upon a selected power mode of operation of the cell phone (step 306).

For example, if the cell phone host enters into a silent or deep sleep mode of operation, the cell phone host generates power control commands to the wireless headset to enter into a deep sleep or silent mode of operation. In the described embodiment, the headset is placed into a silent mode as described herein wherein the wireless headset occasionally powers its receiver circuitry to "snoop" for power up commands from the cell phone host regardless of whether the cell phone host is in a deep sleep mode or in a silent mode.

The inventive method further includes transmitting power control commands to the wireless headset to power up based upon a received broadcast signal received from a base station over the cell phone interface (step 308). For example, the method includes generating the power control commands to the wireless headset to power up if the broadcast message from the base station indicates that there is one of a call or message waiting for a user of the wireless cell phone host. In the described embodiment, a power up command to the headset is generated for voice messages and not for text messages. In an alternate embodiment, however, the power up commands are generated for any type of message. Additionally, in this described embodiment, one aspect includes making the correlation between power up messages and message type selectable by the user. Finally, the method includes entering into a deep sleep mode upon receiving a specified verbal command to enter into a sleep mode from the wireless headset (step 310).

In operation, the user speaks a specified command which is transmitted by the wireless headset to the cell phone host. The cell phone host receives the command through, for example, the second radio front end, processes the command sufficient to recognize it, and then generates power down commands to the wireless headset from the second radio front end. Additionally, the cell phone host enters into a deep sleep or silent mode of operation until a condition for power up occurs. Conditions for power up include receiving an indication that a call or message is waiting or, alternatively, depression of a button on the cell phone host.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The invention disclosed herein is susceptible to various modifications and alternative forms. Specific embodiments therefore have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As one of average skill in the art will appreciate, other embodiments may be derived from the teaching of the present invention, without deviating from the scope of the claims.

What is claimed is:

1. A radio transceiver hand held host system, comprising:
first and second wireless transceiver units operatively coupled to function as a single system;
the first wireless transceiver unit further comprising:
first and second radio front end circuit blocks for transmitting and receiving radio frequency communication signals utilizing first and second wireless communication protocols, respectively, the first and second radio front end circuit blocks further including a plurality of transceiver elements;
logic for prompting a processor module to control power levels of a plurality of transceiver and application elements according to an operational mode of the radio transceiver system; and
wherein the logic, based upon the operational mode of the radio transceiver system, controls power levels of at least one of the first and second radio front end circuit blocks and further prompts one of the first or second radio front end circuit blocks to transmit power mode control signals to prompt the second wireless transceiver unit to enter into a power saving mode; and
the second wireless transceiver unit further comprising:
third radio front end circuit block further including a plurality of transceiver elements for transmitting and receiving radio frequency communication signals utilizing the second wireless communication protocol; and
logic for prompting the third radio front end circuit block to control power levels of application elements and the plurality of transceiver elements of the third radio front end block.

2. The radio transceiver hand held host system of claim 1 wherein the second wireless transceiver unit comprises a wireless headset host and further wherein the power mode control signals prompt the second wireless transceiver unit to place a plurality of transceiver and circuit elements of the second wireless transceiver unit into a deep sleep mode to conserve power.

3. The radio transceiver hand held host system of claim 2 wherein the plurality of transceiver and circuit elements of the second wireless transceiver unit comprises at least one speaker, a microphone, and at least one amplifier.

4. The radio transceiver hand held host system of claim 2 wherein the wireless headset host is operable to exit the deep sleep mode by powering up based upon the power mode control signals received from the first wireless transceiver unit.

5. The radio transceiver hand held host system of claim 4 wherein the power mode control signals generated by the first wireless transceiver unit direct the wireless headset host into or out of a deep sleep mode based upon a broadcast channel indicating whether there are any pending messages for a user of the radio transceiver hand held host system.

6. The radio transceiver hand held host system of claim 1 wherein the first radio front end circuit block is operable to communicate over a cellular communication protocol.

7. The radio transceiver hand held host system of claim 1 wherein the second and third radio front end circuit blocks are operable to communicate over a wireless local area network communication protocol.

8. The radio transceiver hand held host system of claim 1 wherein the second and third radio front end circuit blocks are operable to communicate according to at least one of an 802.11 based protocol and a personal area network protocol.

9. The radio transceiver hand held host system of claim 1 wherein the logic is operable to place the first and second radio front end circuit blocks in a deep sleep mode and then, while keeping the second radio front end circuit block in deep sleep mode, to prompt the first radio front end circuit block to power up to search and analyze a broadcast signal to determine if there are any pending messages for the user of the radio transceiver hand held host system.

10. The radio transceiver hand held host system of claim 1 wherein the logic is operable to prompt the second radio front end circuit block to power up to transmit a wireless signal to the third radio front end circuit block to power up.

11. The radio transceiver hand held host system of claim 10 wherein the second radio front end circuit block continues to transmit the wireless signal to power up to the third radio front end circuit block until the third radio front end circuit block generates a reply.

12. The radio transceiver hand held host system of claim 11 wherein second radio front end continues to transmit the wireless signal to power up to the third radio front end circuit block until the third radio front end circuit block generates a reply.

13. The radio transceiver hand held host system of claim 11 wherein the second wireless transceiver unit includes logic for, while in a deep sleep mode of operation, to prompt the second wireless transceiver unit to periodically power up at least partially to determine if the first wireless transceiver unit is transmitting the power up wireless signal.

14. The radio transceiver hand held host of claim 1 wherein the logic formed is in hardware.

15. The radio transceiver hand held host of claim 1 wherein the logic formed is in software instructions executed by a processor.

16. The radio transceiver hand held host system of claim 1 wherein the logic of the first wireless transceiver unit prompts at least one of front end radio transceiver circuitry, analog-to digital circuitry, digital-to-analog circuitry, and user interface circuitry to power down.

17. The radio transceiver hand held host system of claim 1 wherein the logic of the second wireless transceiver unit prompts at least one of front end radio transceiver circuitry, analog-to digital circuitry, digital-to-analog circuitry, and user interface circuitry to power down.

18. The radio transceiver hand held host system of claim 1 wherein the logic of the first wireless transceiver unit selectively powers at least one of a game module, an MP3 module, a calculator module, an audio module, an Infrared Data Association (IrDA) standards serial infrared communications data link, a remote I/O (RIO) module, and a cellular phone transceiver front end circuit.

19. The radio transceiver hand held host system of claim 18 wherein the first wireless transceiver unit is operable to generate control signals to place the second wireless transceiver unit into a deep sleep mode whenever transceiver elements of the first wireless transceiver unit are to be powered down.

* * * * *